United States Patent [19]

Yamada

[11] Patent Number: 4,646,863
[45] Date of Patent: Mar. 3, 1987

[54] FRONT STRUCTURE OF VEHICLE BODY

[75] Inventor: Kiyoshige Yamada, Hiroshima, Japan

[73] Assignee: Mazda Motor Corporation, Hiroshima, Japan

[21] Appl. No.: 689,957

[22] Filed: Jan. 9, 1985

[30] Foreign Application Priority Data

Jan. 14, 1984 [JP] Japan ................................ 59-2983[U]
Jan. 14, 1984 [JP] Japan .................................... 59-4257
Jan. 14, 1984 [JP] Japan .................................... 59-4258

[51] Int. Cl.$^4$ .............................................. B60R 19/08
[52] U.S. Cl. .................................... 180/68.1; 293/120
[58] Field of Search .............. 293/120; 180/68.1, 68.4, 180/68.6

[56] References Cited

U.S. PATENT DOCUMENTS 4,060,142 11/1977 Abe ...................................... 180/68.1
4,466,646 8/1984 Delmastro et al. ............. 293/120 X

FOREIGN PATENT DOCUMENTS 52-112045 2/1977 Japan .
552153 3/1943 United Kingdom ............... 180/68.1

OTHER PUBLICATIONS

"Ford", Chemical Engineering, Dec. 4, 1967, p. 40.

Primary Examiner—John J. Love
Assistant Examiner—Michael Mar
Attorney, Agent, or Firm—Gerald J. Ferguson, Jr.; Michael P. Hoffman; Ronni S. Malamud

[57] ABSTRACT

A fascia set plate for mounting thereon the upper end portion of a soft fascia and right and left wind-guide side panels for guiding air introduced from the front of a vehicle body to a radiator are provided in front of a radiator shroud panel, and the lower end portions of the wind-guide side panels are connected to right and left side frames, respectively, thereby supporting the fascia set plate by the right and left wind-guide side panels. That is, a channel-like structure which is superior in strength is defined by the pair of wind-guide side panels and the fascia set plate as viewed from the front of the vehicle body, and forces exerted on the soft fascia are borne by the side frames by way of the channel-like structure.

3 Claims, 5 Drawing Figures

FRONT STRUCTURE OF VEHICLE BODY

BACKGROUND OF THE INVENTION

1. Field of the Invention

This invention relates to a front structure of a vehicle body having an outer shell formed of a soft fascia of a soft skin member.

2. Description of the Prior Art

Recently, the outer shell of the front end portion of a vehicle body is sometimes formed with a soft skin member called a soft fascia for the purpose of weight saving and/or due to a high degree of freedom in forming of the soft fascia. In the past, the upper end portion of the soft fascia is fixed to the vehicle body by fixing a retainer integrally provided on the soft fascia to a radiator shroud member such as a shroud upper as disclosed in Japanese Unexmined Utility Model Publication No. 52(1977)-112045, for instance.

For design reasons, it is sometimes preferred that the front nose projects forwardly from the radiator shroud member by a substantial amount. In such cases, the rear end portion of the soft fascia must be forwardly spaced away from the radiator shroud member by a substantial distance. In such cases, in order to support the soft fascia by the means disclosed in the aforesaid publication, said retainer (which is integral with the soft fascia) must be rearwardly extended by a large amount to be fixed to the radiator shroud member, or an additional retainer member must be provided on the radiator shroud member to extend forwardly therefrom so that the retainer on the soft fascia is fixed to the additional retainer on the radiator shroud member.

In either case, there is required a retainer extending in the longitudinal direction of the vehicle body by a large amount and accordingly there arises a problem with the strength in supporting the soft fascia. For example, the weight of the soft fascia and the external force exerted on the upper end of the soft fascia are borne by the radiator shroud member by way of an elongated retainer which is supported on the radiator shroud member in a cantilever fashion. Therefore, the retainer can be easily bent, causing the mounting position of the soft fascia to deviate.

SUMMARY OF THE INVENTION

In view of the foregoing observations and description, the primary object of the present invention is to provide an improved front structure of a vehicle body in which the soft fascia can be firmly mounted and supported on the vehicle body even when the soft fascia projects forwardly from the radiator shroud by a large distance.

In accordance with the present invention, a fascia set plate for mounting thereon the upper end portion of the soft fascia and right and left wind-guide side panels for guiding air introduced from the front of the vehicle body to a radiator are provided in front of a radiator shroud panel, and the lower end portions of the wind-guide side panels are connected to right and left side frames, respectively, thereby supporting the fascia set plate by the right and left wind-guide side panels. That is, a channel-like structure which is superior in strength is defined by the pair of wind-guide side panels and the fascia set plate as viewed from the front of the vehicle body, and forces exerted on the soft fascia are borne by the side frames by way of the channel-like structure.

In a preferred embodiment of the present invention, the wind-guide side panels are connected at respective lower end portions by way of a cross member which defines together with the wind-guide side panels and the fascia set plate a closed structure as viewed from the front of the vehicle body. The closed structure is superior in strength, and forces exerted on the soft fascia are borne by the side frames by way of the closed structure.

In another preferred embodiment of the present invention, the fascia set plate is supported at an intermediate portion by a stay extending upwardly from the cross member, whereby the rigidity of the fascia set plate is further enhanced.

DESCRIPTION OF THE PREFERRED EMBODIMENT

Figure 1:
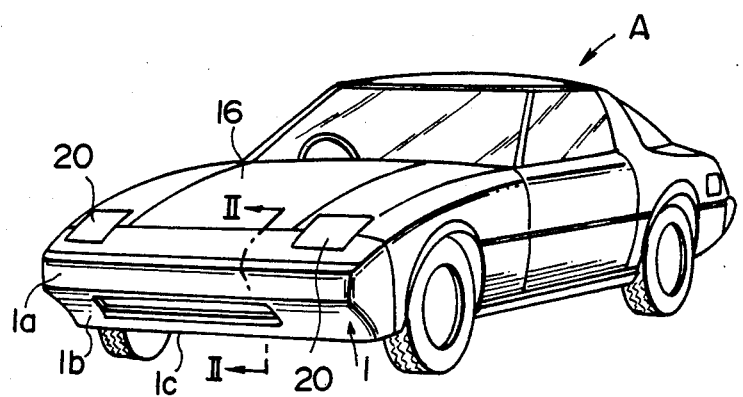
FIG. 1 is a perspective view of an automobile employing a front structure in accordance with an embodiment of the present invention.

In FIG. 1, an automobile A has a front end portion the outer shell of which is formed with a soft fascia 1 of a soft skin member. The soft fascia 1, in the illustrated embodiment, comprises a front fender portion 1a and an air-skirt portion 1b extending downward from the front fender portion 1a. The air-skirt portion 1b is provided with an air inlet 1c for introducing air during the movement of the vehicle.

Figure 2:
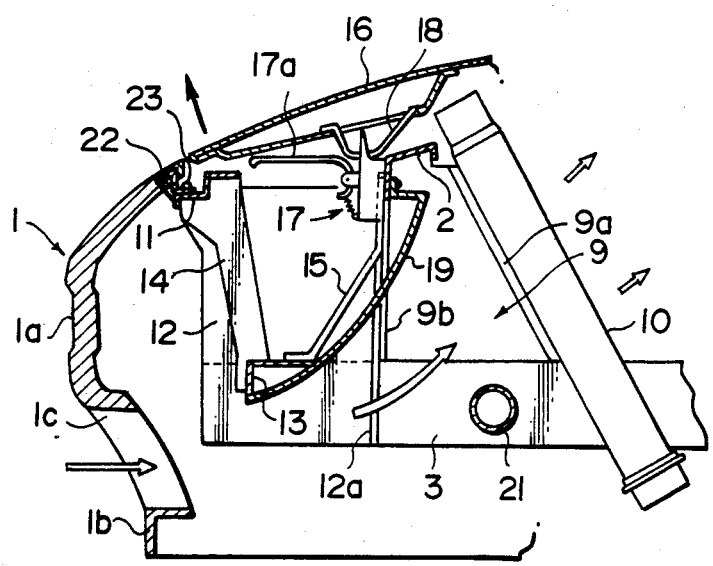
FIG. 2 is a cross-sectional view taken along line II—II in FIG. 1.
Figure 3:
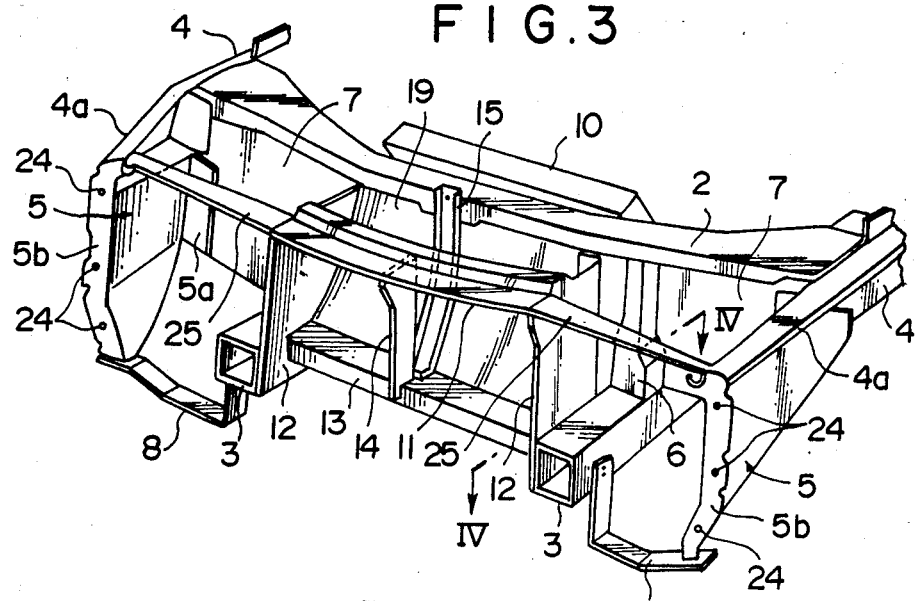
FIG. 3 is a fragmentary perspective view showing the front structure with the soft fascia removed.
Figure 4:
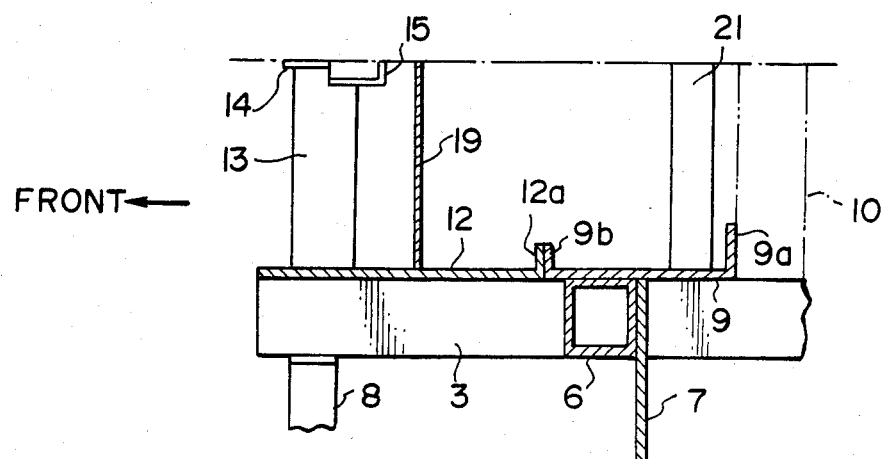
FIG. 4 is a cross-sectional view taken along line IV—IV in FIG. 3.

The mounting structure of the soft fascia 1 will be described hereinbelow with reference to FIGS. 2 to 4. In FIGS. 2 to 4, reference numeral 2 denotes a shroud upper which extends in the transverse direction of the vehicle body and forms a part of the radiator shroud member, and reference numerals 3 denote right and left side frames extending in the longitudinal direction of the vehicle body. Reference numerals 4 and 5 respectively denote right and left apron reinforcements, and right and left fender brackets. Each apron reinforcement 4 has an arm-like forward extension 4a extending forward beyond the shroud upper 2 and each side frame 3 also extends forward beyond the shroud upper 2.

The ends of the shroud upper 2 are connected to the respective apron reinforcements 4. A pair of supporting posts 6 extend vertically to connect the shroud upper 2 to the respective side frames 3 at portions near the ends of the shroud upper 2. The structure of each supporting post 6 is closed in cross section. A pair of spaces formed below the shroud upper 2 on the outer sides of the respective supporting posts 6 are closed by a radiator shroud panel 7 the surface of which extends in the transverse direction of the vehicle body. The radiator shroud panel 7 is connected to the shroud upper 2, the apron reinforcements 4 and the supporting posts 6 along the peripheral edge thereof. Further, to the radiator shroud panel 7 are connected rear flange portions 5a of the respective fender brackets 5, and to the upper edges of the respective fender brackets 5 are connected the forward extensions 4a of the respective apron reinforcements 4. Each fender bracket 5 is connected, at a lower front end portion thereof to the corresponding side frame 3 by way of a reinforcement bracket 8.

As clearly shown in FIG. 4, a radiator support bracket 9 is fixed to the inner surface of each supporting post 6. The surface of each radiator support bracket 9 extends perpendicularly to the transverse direction of the vehicle body. Each radiator support bracket 9 is connected to the shroud upper 2 at the upper end, to the corresponding side frame 3 at the lower end and to the corresponding supporting post 6 at an intermediate portion. The radiator support bracket 9 is provided with a rear flange portion 9a, and a radiator 10 disposed behind the shroud upper 2 is mounted on the rear flange portion 9a of the radiator support bracket 9.

In front of the shroud upper 2 are provided a fascia set plate 11 extending in the transverse direction of the vehicle body and right and left wind-guide side panels 12. Each wind-guide side panel 12 is connected to the corresponding side frame 3 at the lower end thereof and is provided with a rear flange portion 12a which is connected to a front flange portion 9b of the radiator support bracket 9. The fascia set plate 11 is connected to the right and left wind-guide side panels 12 at the ends. A cross member 13 connects lower end portions of the respective wind-guide side panels 12 to increase the transverse rigidity of the side frames 3 and the wind-guide side panels 12. A front stay 14 connects the cross member 13 and the fascia set plate 11 at their intermediate portions to reinforce the fascia set plate 11 at the intermediate portion. Further the intermediate portion of the shroud upper 2 is reinforced with a rear stay 15 connecting the intermediate portion of the shroud upper 2 to an intermediate portion of the cross member 13. As clearly shown in FIG. 2, a hood lock device 17 for locking a hood 16 is mounted on the top of the connection between the rear stay 15 and the shroud upper 2. The hood lock device 17 may be of a known structure. That is, when a main lock release knob (not shown) in the compartment is operated to act on a striker 18 mounted on the hood 16, the hood 16 is slightly opened to form a space which gives access to a sub lock release lever 17a and the hood 16 is completely released by manually operating the sub lock release lever 17a.

Between the cross member 13 and the shroud upper 2 extends a central wind guide panel 19 which is downwardly convex. In this particular embodiment, the front end portion of the central wind guide panel 19 forms the base wall of the cross member 13, whereby the cross member 13 is of closed section structure so that the rigidity thereof is enhanced. The front end portion of the central wind guide panel 19 is positioned at substantially the same height as the upper edge of the air inlet 1c of the soft fascia 1. Thus, the air introduced through the air inlet 1c blows against the radiator 10 flowing between the right and left wind guide side panels 12 and below the central wind guide 19. The central wind guide panel 19 is connected at its side edges to the wind guide side panels 12 to provide a further increase in strength.

Reference numeral 20 in FIG. 1 and reference numeral 21 in FIG. 2 respectively denote a retractable headlamp and a tubular cross member extending between the right and left side frames 3 below the shroud upper 2. Though not shown, on the side frames 3 is supported a bumper which is positioned immediately behind the front fender portion 1a of the soft fascia 1 to effectively form a front fender.

The soft fascia 1 is provided with a retainer 22 embedded therein at the upper end thereof, and is fixed by seating the retainer 22 on the fascia set plate 11 and securing the same by screws 23 as shown in FIG. 2. The right and left side edges of the soft fascia 1 are screwed to front flange portions 5b of the respective fender brackets 5. Threaded holes for this purpose are indicated at 24 in FIG. 3. The front flange portion 5b of each fender bracket 5 is reinforced by connection with the forward extension 4a of the corresponding apron reinforcement 4.

Although in the embodiment described above, the hood lock device 17 is mounted on the connection between the rear stay 15 and the shroud upper 2, the hood lock device 17 may be mounted on the intermediate portion of the fascia set plate 11 at which the front stay 14 is connected to the fascia set plate 11. In this case, the rear stay 15 may be omitted.

Further, the right and left fender brackets 5 may be connected at respective upper front portions to an upper front end portion of the assembly of the wind-guide side panels 12 and the fascia set plate 11 by way of a reinforcement bracket 25 shown in FIG. 3. In this case, the reinforcement bracket 25 may be formed integrally with the fascia set plate. This arrangement contributes to an increase in the rigidity of the fender brackets 5, and prevents the retractable head lamps 20 from being damaged by the soft fascia 1 which is apt to be deformed rearwardly upon collision.

Figure 5:
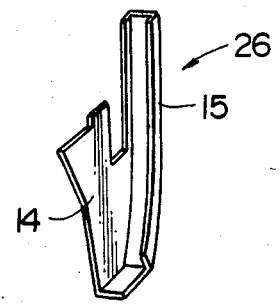
FIG. 5 is a perspective view showing a modification of the stay employed in the structure of FIG. 1.

The front stay 14 and the rear stay 15 may be formed integrally as shown in FIG. 5 and indicated at 26. That is, the stay 26 is bifurcated upwardly into front and rear stay portions. The front stay portion is adapted to connect the fascia set plate to the cross member, and the rear stay portion is adapted to connect the cross member to the upper portion of the radiator shroud member.

Further, by uniting beforehand the fascia set plate 11, the wind-guide side panels 12, the cross member 13, the front stay 14, the rear stay 15 and the central wind-guide panel 19 into a single unit, the unit can be assembled with improved accuracy.

As can be understood from the description above, in accordance with the present invention, the soft fascia can be firmly mounted and supported without substantially adding to the number of components because the fascia set plate is supported by wind-guide side panels and no additional supporting member is provided for supporting the fascia set plate.

I claim:

1. In a front structure of a vehicle body comprising a soft fascia covering the front of the vehicle body;
   the improvement which comprises a transversely extending fascia set plate, on which the upper end portion of the soft fascia is to be mounted, positioned in front of a transversely extending radiator shroud member;
   right and left wing-guide side panels, for guiding air introduced at the front of the vehicle in motion to a radiator, mounted in front of the radiator shroud member and forming right and left guide faces;
   said right and left wind-guide side panels supporting said fascia set plate, and said panels and set plate forming a U-shaped soft fascia support structure;
   means respectively connecting lower end portions of said wind guide side panels to right and left side frames, said side frames having extended portions in front of portions of said side frames supporting the radiator shroud member, and said lower end portions of said wind-guide side panels being connected to said extended portions;

a cross member connecting the lower end portions of the right and left wind-guide said panels; said panels, fascia set plate, and cross member forming a soft fascia support structure having a substantially rectangular closed cross section, and said fascia set plate being supported at an intermediate portion by a stay extending upwardly from the cross member, a front stay portion connecting the fascia set plate to the cross member, and a rear stay portion connecting the cross member to the upper portion of the radiator shroud member.

2. A front structure as defined in claim 1 in which said stay is bifurcated upwardly into front and rear stay portions.

3. A front structure as defined in claim 1 in which said cross member is connected to the upper portion of the radiator shroud member by a central wind-guide panel.

* * * * *